July 13, 1926.

E. P. WEBSTER

MACHINE FOR PACKING BISCUITS

1,592,795

Original Filed Jan. 4, 1924  8 Sheets-Sheet 1

INVENTOR
E. P. Webster
BY
E. W. Anderson
ATTORNEY

July 13, 1926.

E. P. WEBSTER

MACHINE FOR PACKING BISCUITS

Original Filed Jan. 4, 1924    8 Sheets-Sheet 8

INVENTOR
E. P. Webster
BY
E. W. Anderson
ATTORNEY

Patented July 13, 1926.

1,592,795

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

MACHINE FOR PACKING BISCUITS.

Application filed January 4, 1924, Serial No. 684,370. Renewed May 11, 1926.

This invention relates to apparatus for the manufacture of food products of the type in which the uncooked products are placed upon a conveyor, carried through an oven for baking, and, if desired, a drying chamber, and then removed from the conveyor and delivered to the place where the products are to be packed into cartons. More particularly the present invention relates to mechanism for automatically packing the products in cartons, and this mechanism is of particular utility in connection with the manufacture of food products of a fragile character, such as shredded wheat biscuits. The adaptation of the invention to that particular use will accordingly be described, but it is to be understood that the utility of the invention is not limited to any particular type of product.

In the manufacture of shredded wheat biscuits one form of apparatus used includes a conveyor provided with a plurality of pans on which rows of uncooked biscuits are deposited by suitable mechanism. These uncooked biscuits are carried through an oven and drying chamber, and after being baked and dried, are delivered to a removal device by which the biscuits are transferred from the conveyor pan to a receiving surface. One form of removal device suitable for the purpose is that shown in my co-pending application, Ser. No. 571,825, filed June 29, 1922. This device is provided with a plurality of members, each of which is arranged to engage a single biscuit in a group on a pan of the conveyor, and in the operation of the device these members transfer the group of biscuits arranged in single file to a receiving surface and move the biscuits over this surface in successive steps.

The present invention is directed to the provision of mechanism by which the biscuits may be removed from the conveyor and packed by automatic devices in suitable cartons, and this mechanism includes means for insuring that each carton will receive a full charge of the biscuits, and that each biscuit will be properly positioned in the carton. As the biscuits are of a delicate structure and easily susceptible to damage, the mechanism is constructed so that the biscuits are handled individually in the transfer from the pans to the cartons and each biscuit is kept under separate control throughout the movement. In addition, the mechanism includes detecting devices which contact with the biscuits prior to their introducton into the cartons, and these devices alter the operation of the mechanism to prevent less than a full group of biscuits being introduced into the carton at each operation of the packer.

For a better understanding of the invention, reference will be made to the accompanying drawings, in which—

Figure 7 is a section on the line 7—7, Figure 3.

With reference now to the drawings, the conveyor on which the biscuits are carried through the oven is designated by the numeral 1, this conveyor being provided with a plurality of transverse pans or trays 3 in each of which is carried a row of biscuits 1° arranged in a line. In the operation of the conveyor these trays are brought successively into registry with the device by which the biscuits are removed from the conveyor. This device may be termed a rake, and it includes a reciprocatory head 17, which is slidable upon guide rods 18, and is termed a supplementary head, there being also a main head 17ª, said supplementary head being given a greater degree of movement than is said main head. The rake frame 16ª has a slot and pin connection 16ᵇ with the head 17ª, whereby said frame is capable of independent vertically reciprocatory movement. In the movement of the parts in one direction, the teeth 25, of the rake engage between six of the biscuit upon the conveyor trays 3, and remove said six aligned biscuit in single file transversely of the conveyor 1, during the stoppages consequent upon the intermittent movement of the conveyor.

The initial operation of the rake device removes six aligned biscuit upon an inspection table 26; the next operation of the rake causes the teeth thereof (of which there are eighteen) to engage between six aligned biscuit upon the conveyor and six aligned biscuit upon said table and to remove the biscuit from the conveyor and also remove the first six biscuit farther along said table, and the next operation of the rake causes the eighteen teeth thereof to remove six biscuit from the conveyor and twelve biscuit along said table. The supplementary head 17 of the rake is reciprocated by lever 19 having link connection 20 with said head, to thereby operate bell levers 22, through links 23 and elevate the rake frame, until said head 17 contacts with stop 24 of head 17ª, after which the two heads 17 and 17ª are moved as a unit with the rake in elevated position until properly located over the conveyor 1, when in the return movement of the parts, the head 17 is first moved to operate bell levers 22 and depress the rake so that its teeth 25 shall engage between the biscuit upon the conveyor, after which said head contacts with stop 24, and the heads 17 and 17ª are moved as a unit, with the rake in lowered position, to remove the biscuit from the conveyor.

Secured to the rake frame are spring fingers 2ª, located between the teeth 25 of the rake and eighteen in number, one for each biscuit being moved along table 26 and from the conveyor, said fingers being of U-form and adapted to descend upon the biscuit in the descent of the rake and to lightly press upon the biscuit during the action of the rake and to thereby prevent displacement of the biscuit or turning thereof upside down.

Figures 1, 2, 6:
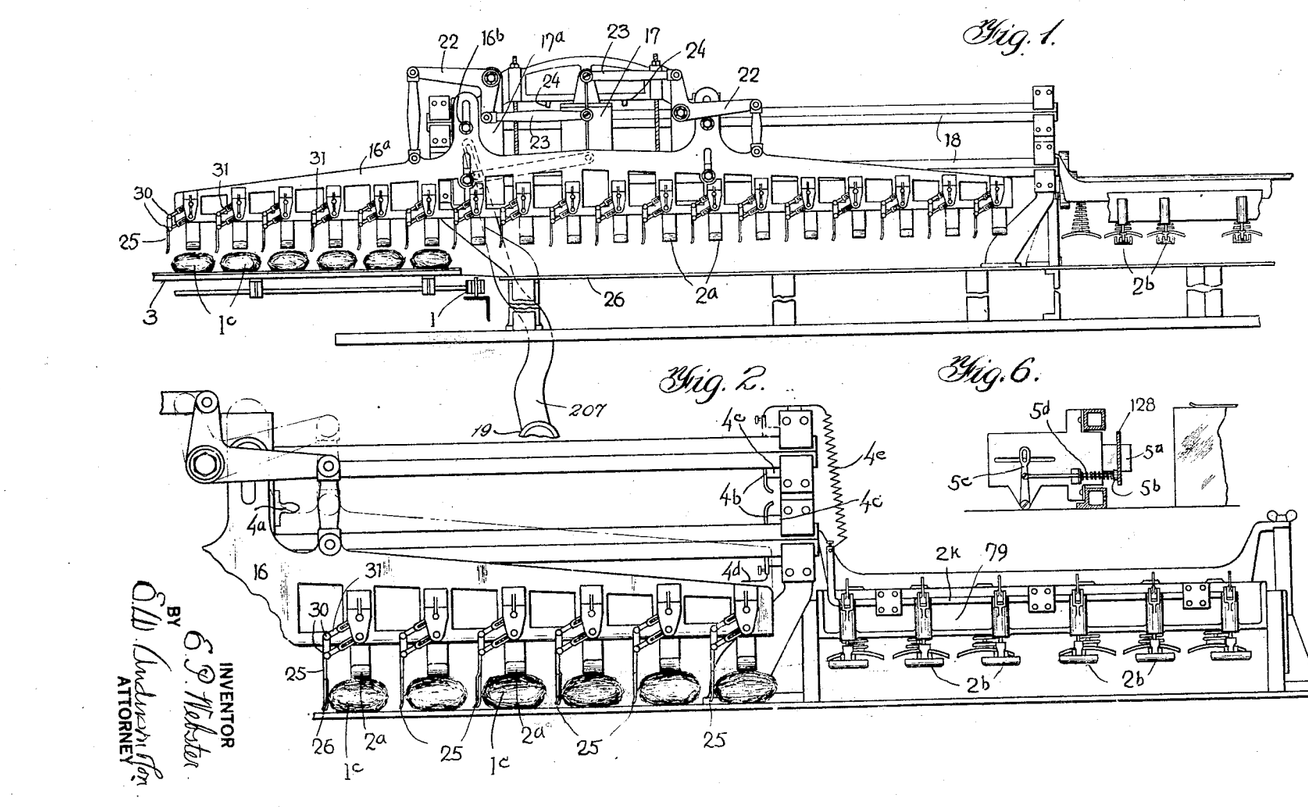
Figure 1 is a side view of the biscuit removal means in position ready to engage the biscuit.
Figure 2 is a fragmentary enlarged view of the same in position engaging the biscuit.
Figure 6 is a section on the line 6—6, Figure 3.
Figures 3, 4:
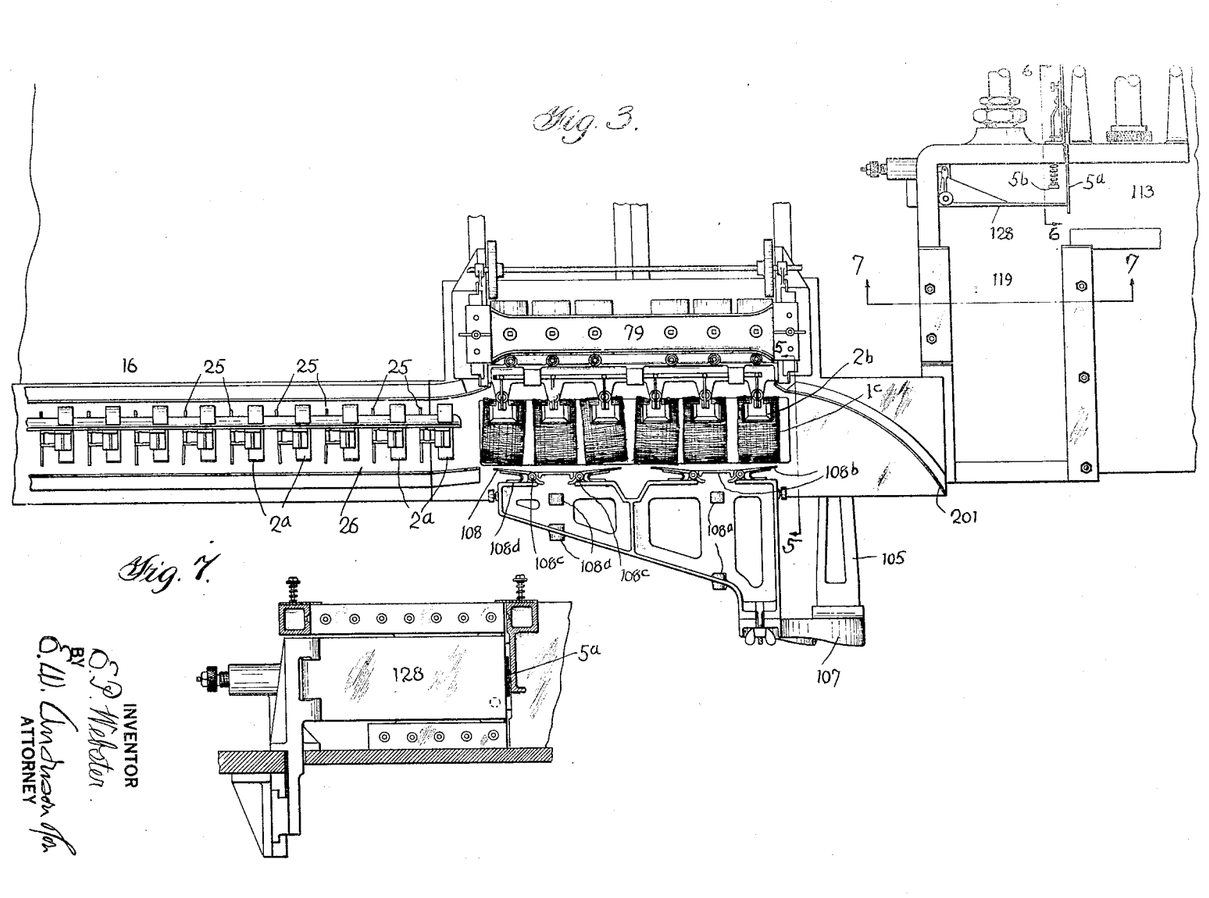
Figure 3 is a plan view of the biscuit removal means and of the packer, parts being broken away.
Figure 4 is a detail side view partly in section of the biscuit controlled means for stopping the operation of the carton feed means.
Figure 4:
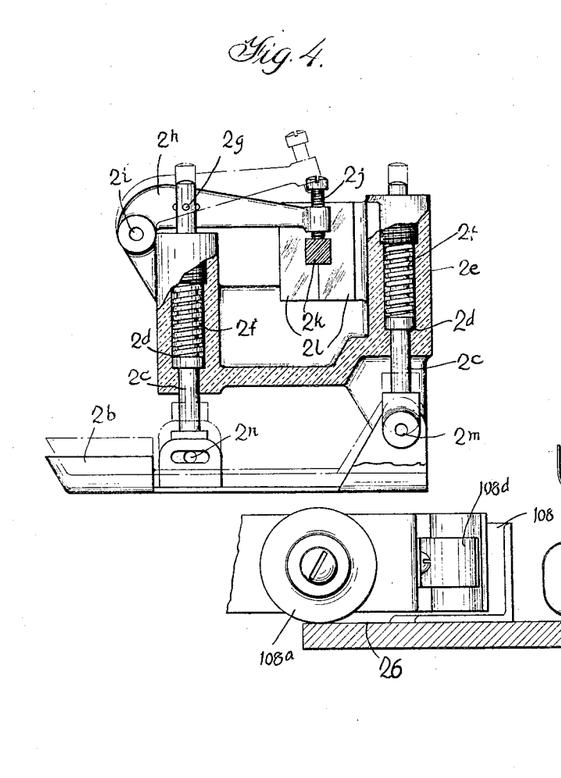
Figure 5:
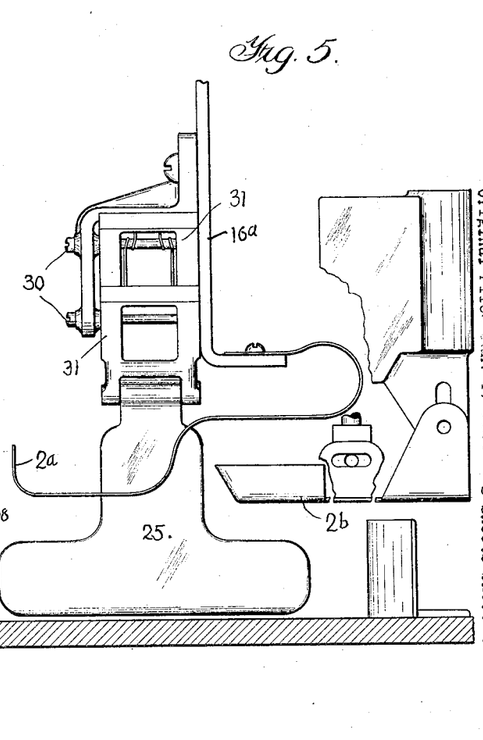
Figure 5 is a section on the line 5—5, Figure 3, with parts broken away.

The rearmost group of six rake teeth 25 are adapted as shown in Figure 3 of the drawings to arrange the six biscuit being fed upon the table 26 adjacent the loading chamber of the packer into two groups of three biscuit each, with the two lateral biscuit of each group in converging relation, the adaptation being due to the two lateral teeth 25 related to each said group being inclined or converging. This biscuit arrangement is done as a preliminary step to the closing together of the biscuit of each group of three, the biscuit being too widely spaced as they are left upon the table 26 by said rake.

The pusher head 108 is made up of three sections 108ᵇ one for each biscuit being fed thereby, said sections being pivoted together at 108ᶜ, and a spring 108ᵈ serving to hold the end sections approximately parallel to the ends of the biscuit being pushed thereby, so that in the operation of the pusher head the biscuit will be fed along paths also converging into the loading chamber of the packer, and will be fed upon the platforms 28 of the packer in two groups of three biscuit each, the two groups spaced apart and the biscuit of each group close together without the necessity for any guides against which the biscuit must abut to accomplish this result.

Figure 8:
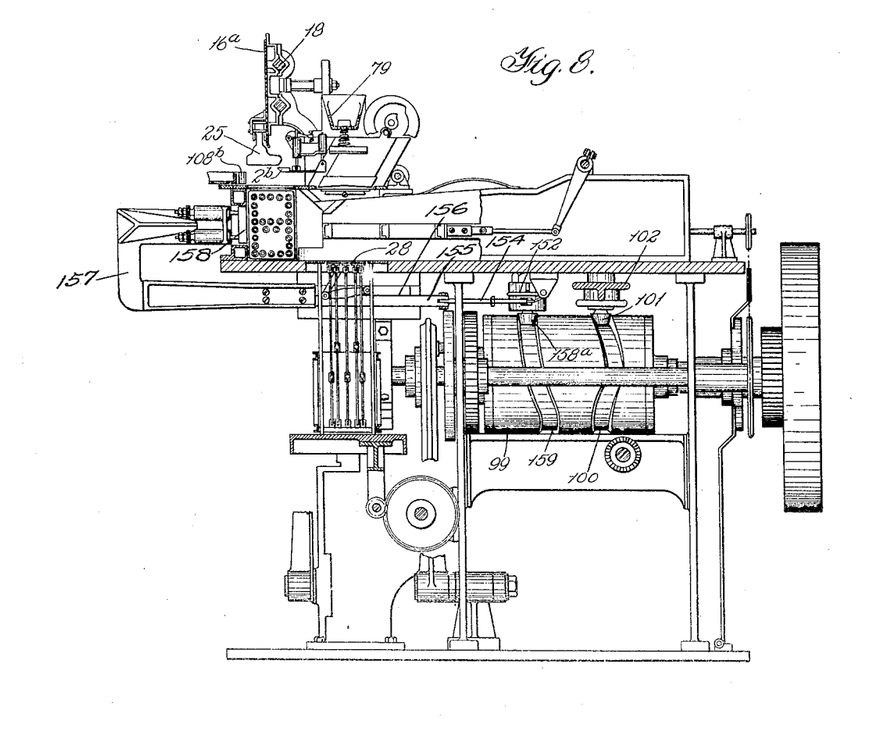
Figure 8 is a central vertical transverse section taken through the center of packer and the biscuit and carton feeding means thereto.
Figure 9:
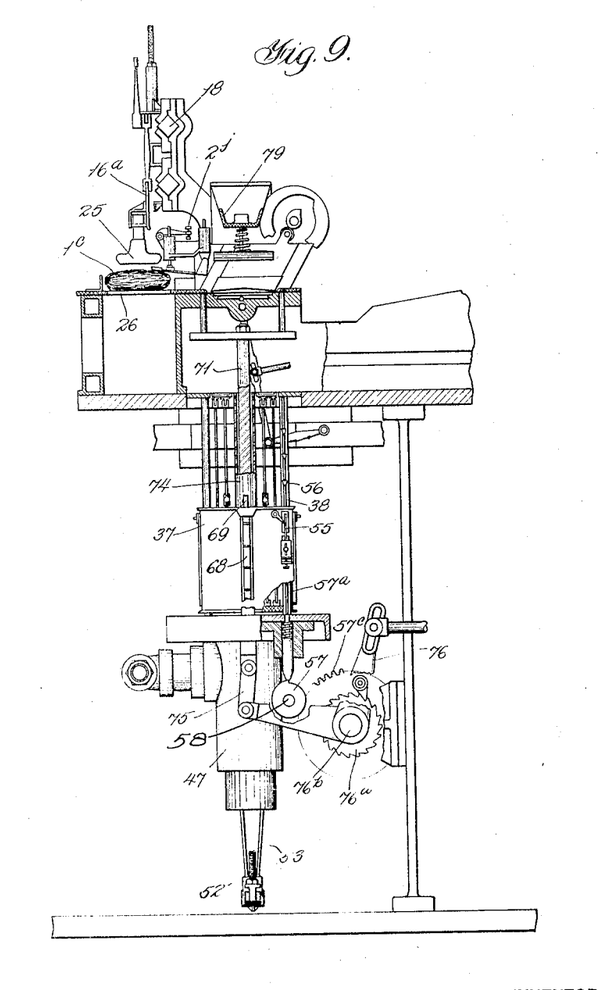
Figure 9 is a similar view taken at one side of the packer.

The following means are used to feed the biscuit from the table 26 transversely of the path of the rake 16 upon the plunger 28 of the packing machine (Figs. 8 and 10):

A rotary cylinder 99 is provided with a circumferential cam groove 100 engaged by a roller 101 of a lever 102, the latter being fulcrumed at one end at 103 and at its other end having a connecting rod 104 with a slide 105, working in guides 106, said slide having upward extension 107 having at its upper end a horizontally reciprocatory pusher head 108, timed to act with the return stroke of the biscuit removal rake to feed two groups of three biscuit each to the platforms 28 of two packing machines.

The cartons are fed to the machines successively, the opened cartons with their bottom end flaps folded to horizontal position and their bottom side flaps folded over against the body of the carton, being fed to position with their bottom openings in register with the platforms 28 by means of a lever 152 fulcrumed at one end at 153 and having at its other end a connecting rod 154 with slide 155, working in guides 156, said slide having upward extension 157, carrying at its upper end the carton pusher head 158. The lever 152 has a roller 158ª engaging a circumferential cam groove 159 of the rotary cylinder 99 aforesaid, being thereby rocked for the purpose stated.

Plunger 28 having passed through the bottom opening of the carton and assumed a position level with the top of the carton, a layer of three biscuit is fed thereupon, when the plunger is lowered one step, of a height equal to the thickness of a biscuit. A second layer of biscuit is now fed to position upon the first layer, and the plunger again lowered, this process being repeated until four layers of biscuit are lowered into the carton.

The movement of the plunger one full stroke to uppermost position is accomplished by a degree of vacuum in cylinder 47, acting upon a cross head 52, the latter having at its outer end vertical rods 53 connected to the plunger frame. Spring pressed pawls 55 engaging teeth 56 of the vertical rods 38 are automatically released to enable the plunger to be moved upwardly at the proper times, by means of cams 57 upon shaft 58, said cams engaging the lower ends of reciprocatory steel strips 57ª, having notches normally in register with the notches between the teeth 56. The cams have gearing connection 57ᶜ with ratchet wheel 76ª, loose upon shaft 76ᵇ of rock lever 76.

For the purpose of accomplishing the step by step downward movement of the plunger, the frame 37 is provided with a lateral series of four teeth, constituting a rack 68, engaged by a pawl 69 pivoted to a reciprocatory vertical rod 71, a spring acting to hold said pawl normally projected and engaged with said rack from without a lateral slot of a vertical sleeve 74 wherein said rod 71 works. This rod 71 is given a vertical reciprocatory movement by means of a link connection 75 with rock lever 76, operated by eccentric 77.

Power being applied to the packer through pulley 205 is transmitted through shaft 206 to crank 207, the latter operating the rake or biscuit removal device 16 through lever 19. The gear 208 upon the shaft 206 meshes with gear 204 loosely mounted upon shaft 203 and having clutch connection therewith at 222, and shaft 203 has gearing connection 209 with the cam cylinder 99, the latter being loosely mounted upon the shaft 206. The shaft 203 has also operating connection 212 with eccentric 77.

In case there should be a biscuit missing from the group of six fed by the rake 16 to the platform 26 adjacent the packer, mechanism is provided to remove the imperfect group from the machine and to substitute therefor a complete group. For this purpose, the biscuits as they are fed along the platform 26 toward the packer, pass under and slightly elevate members 2ᵇ, of which there is one for each of the six biscuits about to be delivered to the carton. Each member 2ᵇ is carried at the lower ends of parallel vertical rods 2ᶜ, which are yieldable upwardly in seats 2ᵈ of supports 2ᵉ carried by the cross head 79. The springs 2ᶠ within the seats lightly force the rods to the lower position and the forward rod 2ᶜ at its upper end has a slot and pin connection 2ᵍ with a lever 2ʰ which is fulcrumed at 2ⁱ and at one end carries a screw 2ʲ which is adapted to contact and make electrical connection with a conductor rod 2ᵏ, mounted in insulated blocks 2ˡ in the frame. The rear ends of the yieldable members 2ᶠ are pivoted at 2ᵐ to the rear rods 2ᶜ. In the initial movement of the biscuit beneath the members, the members are tilted upwardly about pivots 2ᵐ and then are moved upwardly as a whole to the position shown in dotted lines in Fig. 4, the members then lying parallel to the surfaces of the biscuits beneath them. In this position, the levers 2ʰ are moved, as indicated in dotted lines in the figure, so that the contact screws 2ʲ are out of contact with the conductor rod 2ᵏ. The levers 2ʰ are so arranged that a slight movement of the yieldable members 2ᵇ caused by the initial engagement of the biscuits with these members will cause the levers to move out of contact with the conductor rod.

If a biscuit is missing from the group of six delivered by the rake 16 to a position adjacent the packer, one of the yieldable members 2ᵇ which would ordinarily be raised by the biscuit will remain in its lower position and the lever 2ʰ associated therewith will also remain down with its screw 2ʲ in contact with the conductor rod 2ᵏ, while the other members 2ᵇ with their levers 2ʰ are raised.

Figure 10:
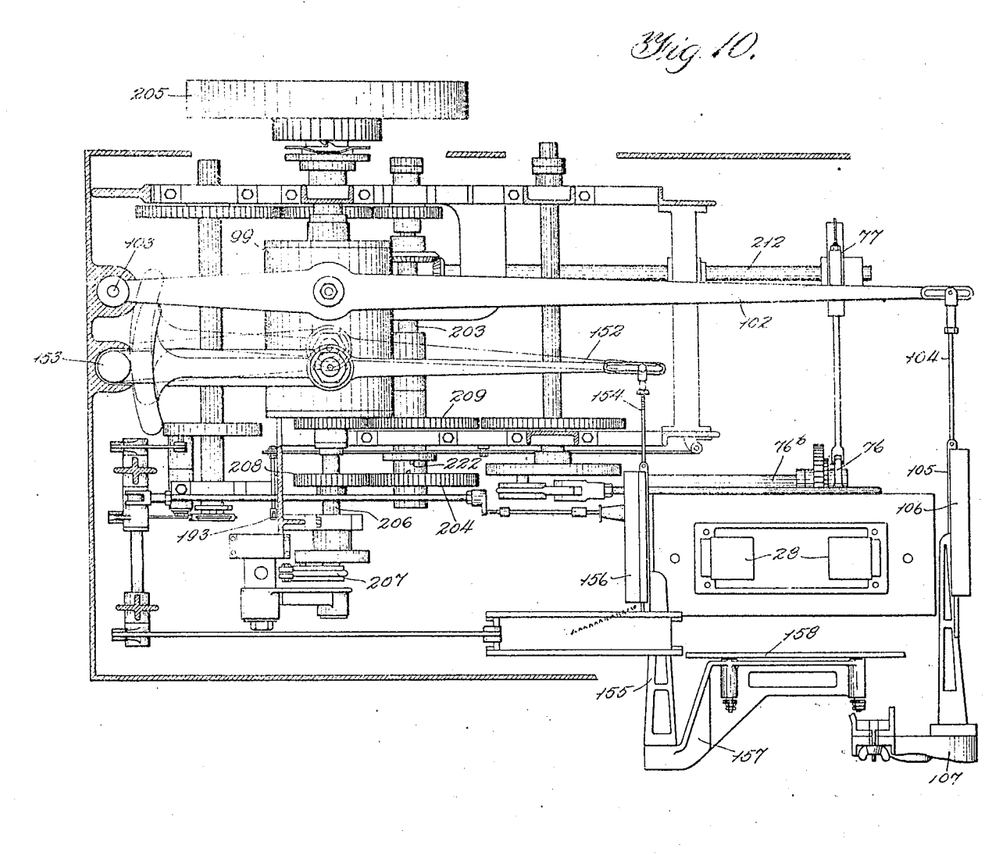
Figure 10 is a plan view of the mechanism of the packing machine located below the main platform thereof.
Figure 11:
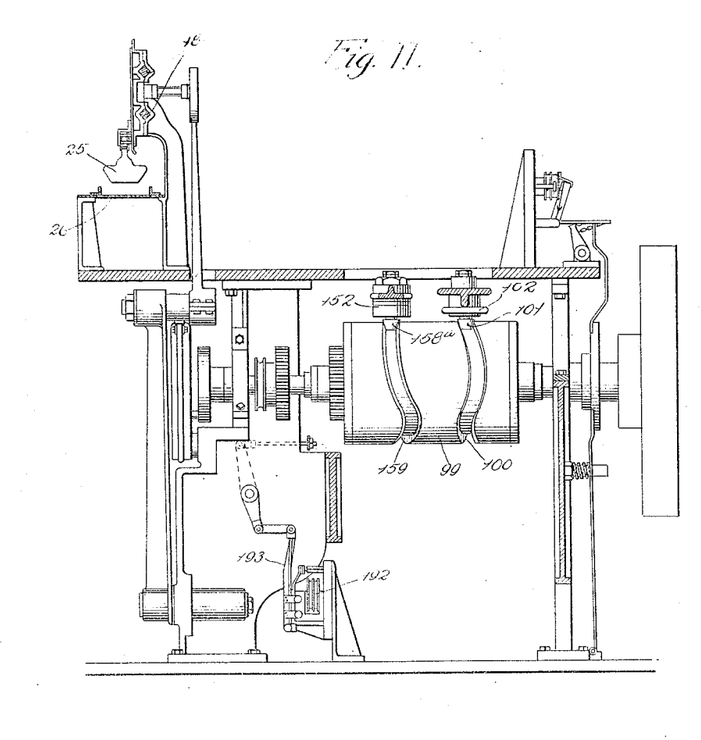
Figure 11 is a vertical transverse section taken through the center of the cam cylinder operating the levers for feeding biscuit and cartons.
Figure 12:
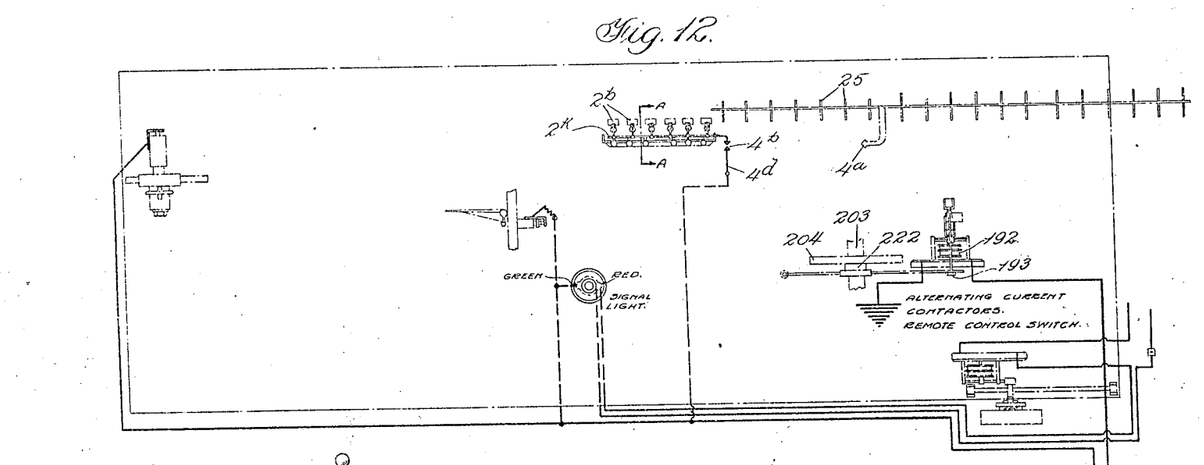
Figure 12 is a diagrammatic view of the several means for stopping the machine through the electrical connections.
Figure 13:
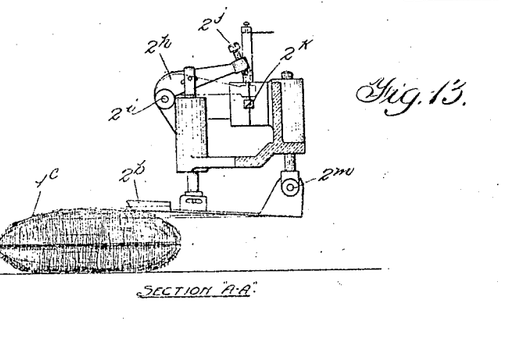
Figure 13 is a detail section on the line A—A, Figure 12.
Figure 14:
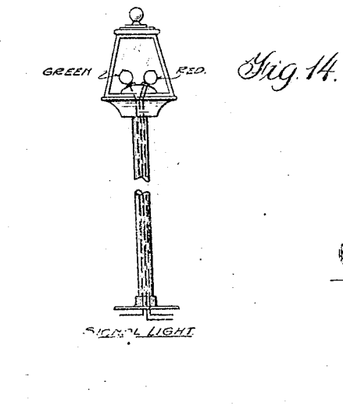
Figure 14 is a detail side view of the signal light.

When the rake 16 arrives at the end of its feeding movement to position biscuits in front of the head 108, a contact member 4ª on the rake frame enters between the spring contacts 4ᵇ mounted on insulating member 4ᶜ on the frame. One of the contacts 4ᵇ is connected by connection 4ᵉ with the conductor rod 2ᵏ and the other is connected by the wire connection 4ᵈ to the magnet 192 (Fig. 11). The magnet and the levers 2ʰ are grounded through the machine frame, and the arrangement is such that whenever a biscuit is absent from a group of six, the contact screw 2ʲ remaining in contact with the conductor bar 2ᵏ, will bring about the energization of the magnet and the magnet will thereupon operate the lever 193 which, through suitable linkage, will cause the release of the clutch 222 (Fig. 10). This clutch controls the operation of the packing machine, including the head 108. The rake, however, continues its movement and upon the next reciprocation of the rake away from the conveyor, the group of biscuits lying on the platform 26 in front of the head 108, will be moved by the rake along the curved guide-way 201 and discharged from the machine.

The operation of the packing machine being thus stopped, with the exception of the rake 16, the succeeding operation of the rake will remove the incomplete group of five biscuit from the machine along curved guideway 201 and will substitute a complete group of six biscuit therefor.

I claim:—

1. In a machine for packing biscuit, means for successively feeding cartons, means for successively feeding rows of biscuit thereto, means for operating the carton feed means and the biscuit feed means, and means cooperating with the biscuit feed means for diverting imperfect rows of biscuit from the cartons including biscuit controlled means for stopping the operating means for the carton feed means and a part of the biscuit feed means having a yieldable member for each biscuit having normally electrical connection with the operating means for the carton feed means and said part of the biscuit feed means and adapted to break said connection through biscuit engagement.

2. In a machine for packing biscuit, a platform, means for successively feeding cartons, means for successively feeding biscuit rows to said platform, means for successively feeding rows of biscuit from said platform to said cartons, means for operating the carton feed means and the biscuit feed means to platform and to cartons, and biscuit controlled means for stopping the operating means for the carton feed means and the biscuit feed means to said platform including a conductor rod, a yieldable member for each biscuit having normally electrical connection with said rod and adapted to break said connection through biscuit engagement, the biscuit feed means to said platform being adapted during such stoppage to remove an imperfect row of biscuit from the biscuit controlled means and to feed a succeeding perfect row of biscuit thereto.

3. In a machine for packing biscuit, a platform, means for successively feeding cartons, means for successively feeding rows of biscuit to said platform, means for successively feeding rows of biscuit from said platform to the cartons, means for operating the carton feed means and the biscuit feed means to platform and to cartons, and electrical biscuit controlled means for stopping the operating means for the carton feed means and the biscuit feed means to the cartons including a conductor rod, a yieldable member for each biscuit, levers having contact normally with said conductor rod and operating connection with said members, and spaced contacts one of which has electrical connection with said conductor rod and both of which are in the electrical circuit of the stopping means, the biscuit feed means to said platform being adapted to establish connection across said contacts at the end of its operative stroke.

4. In a machine for packing biscuit, a platform, means for successively feeding cartons, means for successively feeding biscuit to said platform including yieldable spring fingers for holding down the biscuit, means for successively feeding biscuit from said platform to the cartons, and means cooperating with the biscuit feeding means for diverting imperfect rows of biscuit from the cartons.

5. In a machine for packing biscuit, a platform, means for successively feeding cartons, means for successively feeding biscuit to said platform adapted to arrange certain of the biscuit in converging relation upon said platform and including a rake device certain of the teeth of which are inclined, means for feeding biscuit successively from said platform to said cartons including a sectional pusher head the outer sections of which are yieldable and parallel to the ends of said converging biscuit, and means cooperating with the biscuit feed means for diverting imperfect rows of biscuit from the cartons.

6. In a machine for packing biscuits, the combination of devices for feeding cartons, means for conveying groups of biscuits to the cartons, means for positioning the groups with reference to the conveying means, and detector devices operative whenever a group of biscuits is imperfect to render the conveying means inoperative, the positioning means continuing in operation whereby the defective groups are removed from the machine by the positioning means.

7. In a machine for packing biscuits, the combination of devices for feeding cartons, means for feeding groups of biscuits to the cartons, a clutch for controlling the operation of the carton feeding devices and of a part of the biscuit feeding means, and detector devices contacting with the individual biscuits in a group and operative whenever a group is imperfect for releasing the clutch.

8. In a machine for packing biscuits, the combination of a platform, means for successively feeding cartons to a position adjacent the platform, means for feeding biscuits to the platform and operating to deposit the biscuits on the platform in groups having a predetermined arrangement, means for feeding the groups from the platform to the cartons, and means cooperating with the biscuit feeding means for diverting imperfect groups of biscuits from the cartons.

9. In a machine for packing biscuits, the combination of devices for feeding cartons, means for feeding groups of biscuits to the cartons, detector devices contacting with each biscuit in a group being fed, these detector devices being moved by such contact, and means for rendering the carton feeding devices and a part of the biscuit feeding means inoperative, the said means being brought into action whenever a biscuit is missing from a group so that the corresponding detector device is not moved.

10. In a machine for packing biscuits, the combination of a platform, means for successively feeding cartons to a point adjacent the platform, means for successively feeding biscuits to the platform adapted to deposit the biscuits on the platform in groups of a predetermined arrangement, means for feeding the groups of biscuits from the platform to the cartons, and means cooperating with the biscuit feeding means for diverting imperfect groups of biscuits from the cartons.

11. In a machine for packing biscuits, the combination of a platform, means for successively feeding cartons to a point adjacent the platform, means for successively feeding groups of biscuit over the platform to the cartons, and detector mechanism operative to divert imperfect groups of biscuits from the cartons, this mechanism including yieldable members arranged to contact with the individual biscuits in a group, and means controlled by these members for stopping a portion of the biscuit feeding means.

In testimony whereof I affix my signature.

EARL P. WEBSTER.